J. W. DENMEAD.
MACHINE FOR MAKING SHEET METAL BOXES.
APPLICATION FILED APR. 5, 1906.

949,756.

Patented Feb. 22, 1910.
7 SHEETS—SHEET 4.

WITNESSES:

INVENTOR.
John W. Denmead
BY John A. Nolan
ATTORNEY.

J. W. DENMEAD.
MACHINE FOR MAKING SHEET METAL BOXES.
APPLICATION FILED APR. 5, 1906.
949,756.
Patented Feb. 22, 1910.
7 SHEETS—SHEET 5.
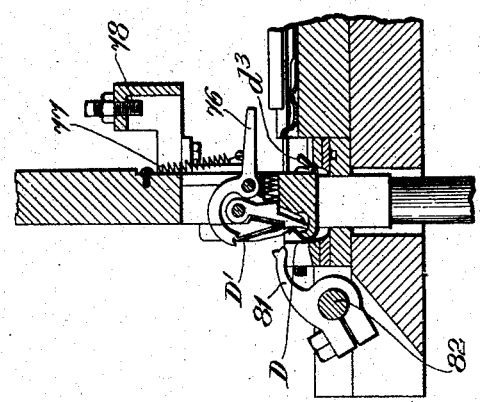
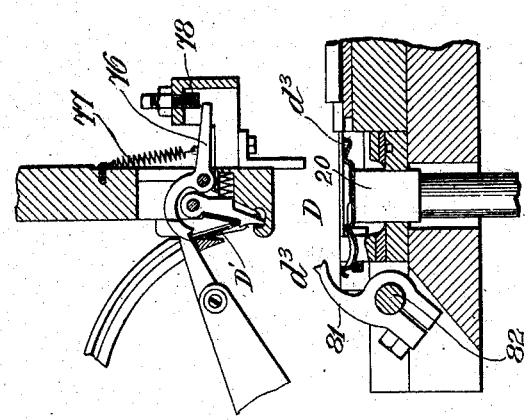
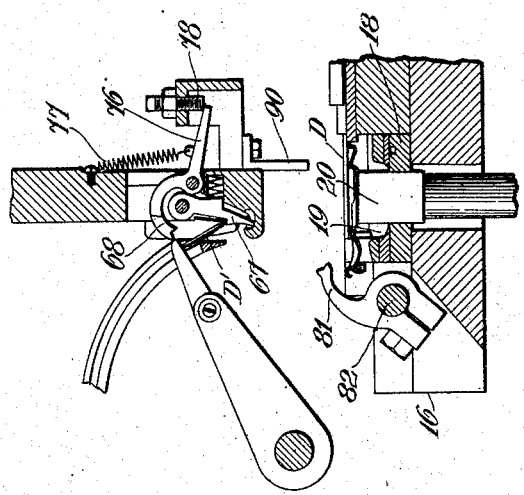
WITNESSES:
E. C. Wedolff
M. G. Hayes
INVENTOR.
John W. Denmead
BY John T. Nolan
ATTORNEY.

J. W. DENMEAD.
MACHINE FOR MAKING SHEET METAL BOXES.
APPLICATION FILED APR. 5, 1906.
949,756.
Patented Feb. 22, 1910.
7 SHEETS—SHEET 6.
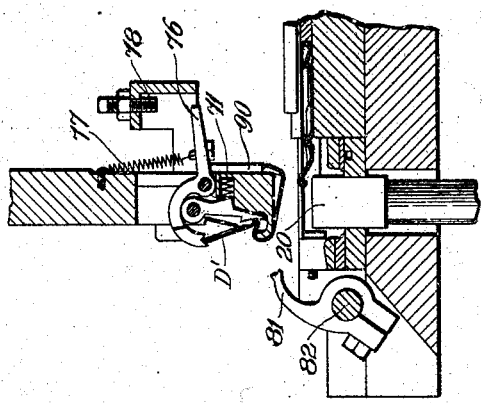
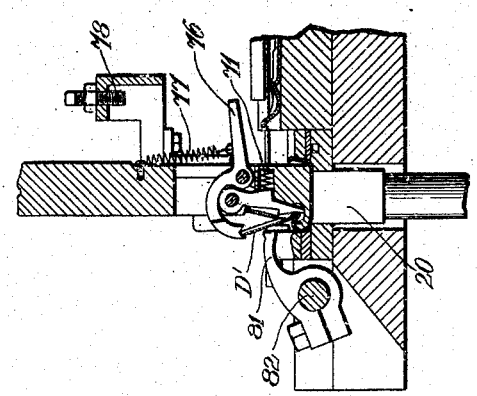
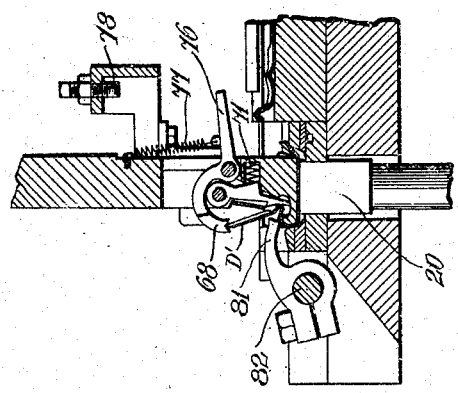
WITNESSES:
INVENTOR.
John W Denmead
BY John F Nolan
ATTORNEY.

J. W. DENMEAD.
MACHINE FOR MAKING SHEET METAL BOXES.
APPLICATION FILED APR. 5, 1906.
949,756.
Patented Feb. 22, 1910.
7 SHEETS—SHEET 7.
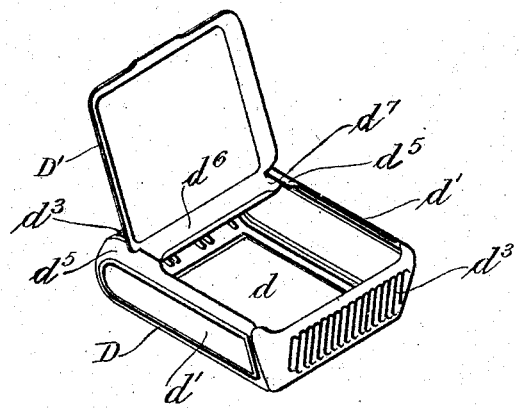
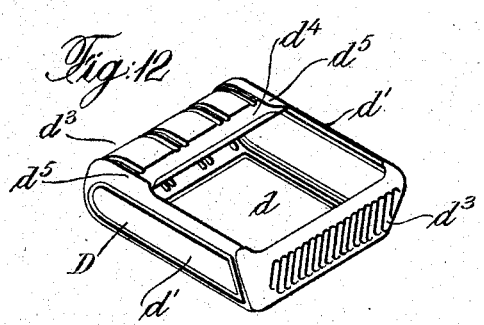 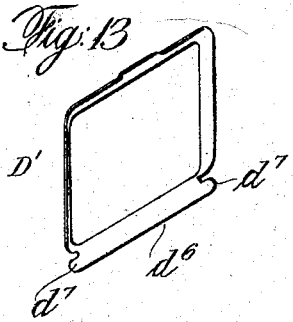
WITNESSES:
INVENTOR.
John W. Denmead
BY John F. Nolan
ATTORNEY.

UNITED STATES PATENT OFFICE.

JOHN W. DENMEAD, OF AKRON, OHIO, ASSIGNOR TO THE DIAMOND MATCH COMPANY, OF CHICAGO, ILLINOIS, A CORPORATION OF ILLINOIS.

MACHINE FOR MAKING SHEET-METAL BOXES.

949,756.      Specification of Letters Patent.      Patented Feb. 22, 1910.

Application filed April 5, 1906. Serial No. 309,965.

*To all whom it may concern:*

Be it known that I, JOHN W. DENMEAD, a citizen of the United States, and resident of Akron, in the county of Summit and State of Ohio, have invented certain new and useful Improvements in Machines for Making Sheet-Metal Boxes, of which the following is a specification.

This invention relates to machines for the production of sheet metal boxes, and more particularly that type of box in which the body is a single or integral portion to which the lid is pivotally connected.

The invention comprises various mechanisms, features of construction and combinations of elements whereby a simple and efficient box-making apparatus is provided, as will be hereinafter fully described and claimed.

Figure 1:
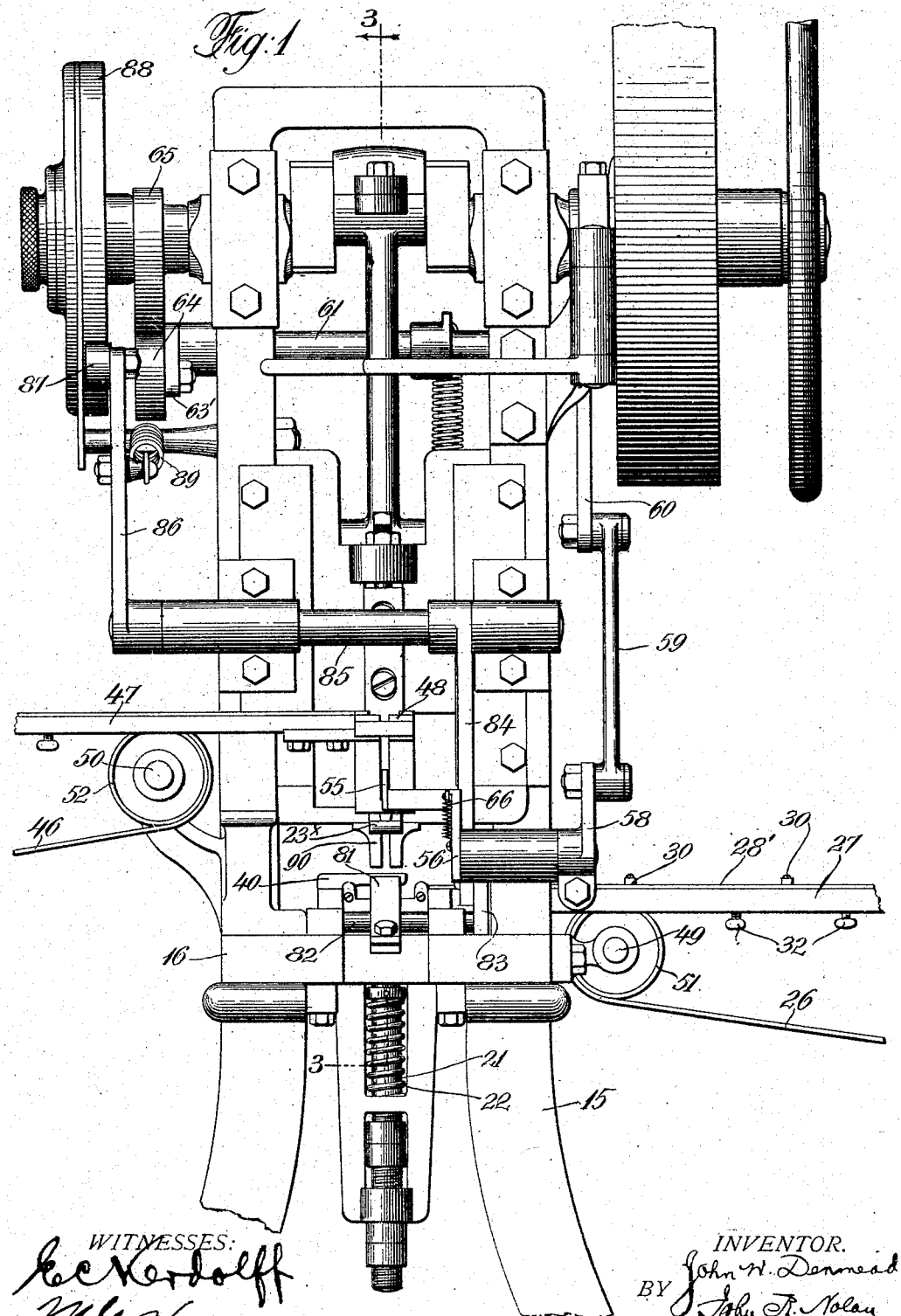
Figure 2:
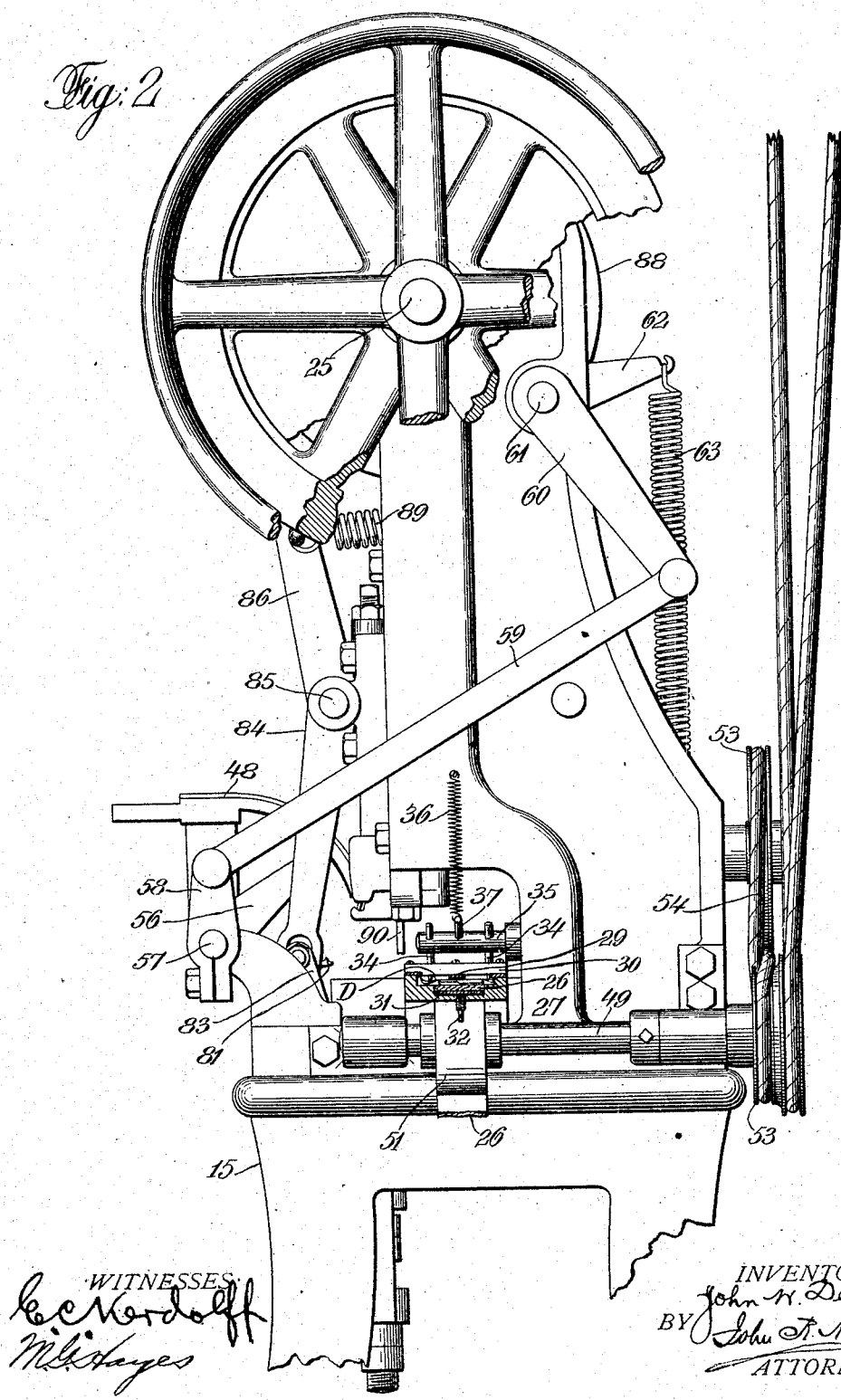
Figure 3:
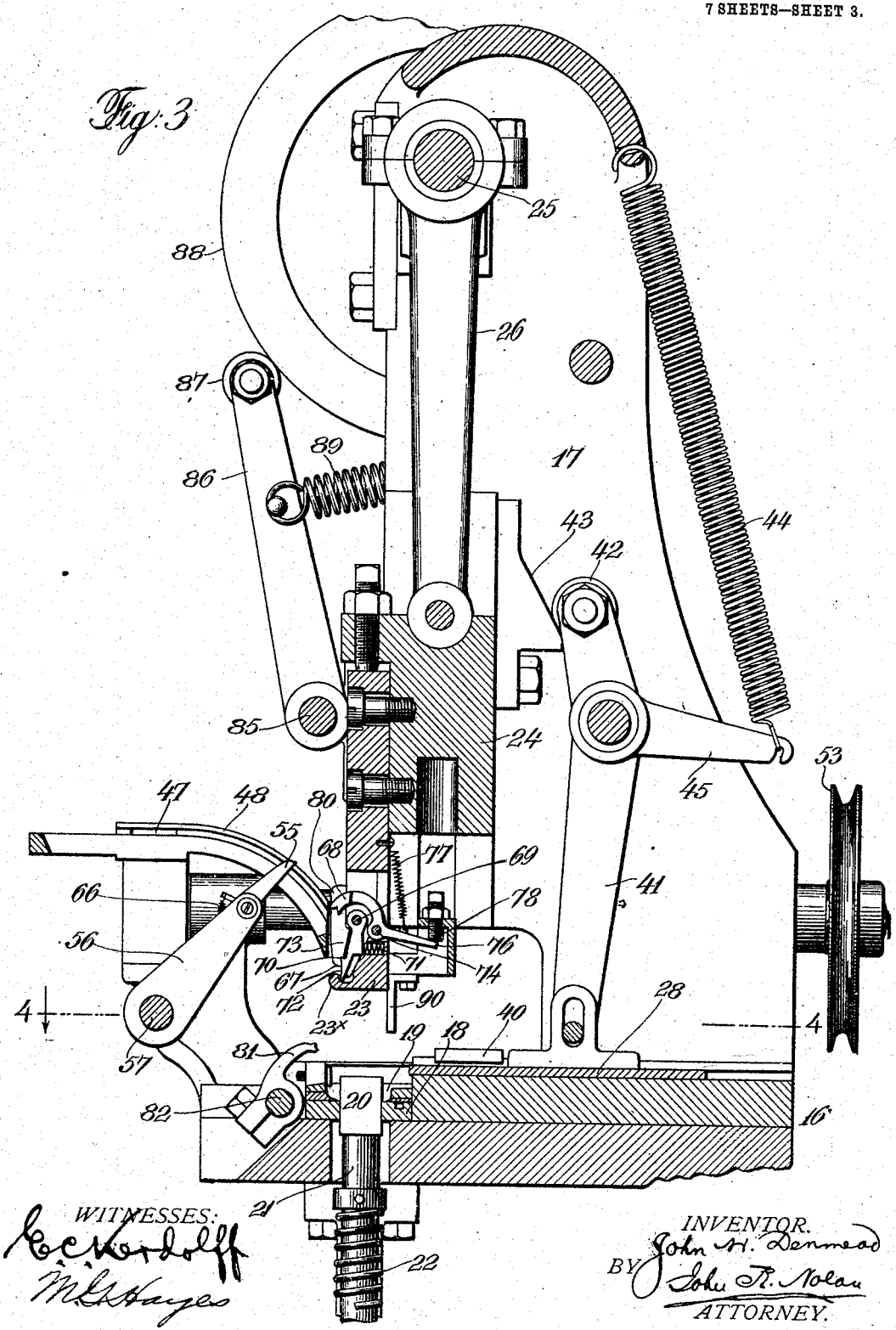
Figure 4:
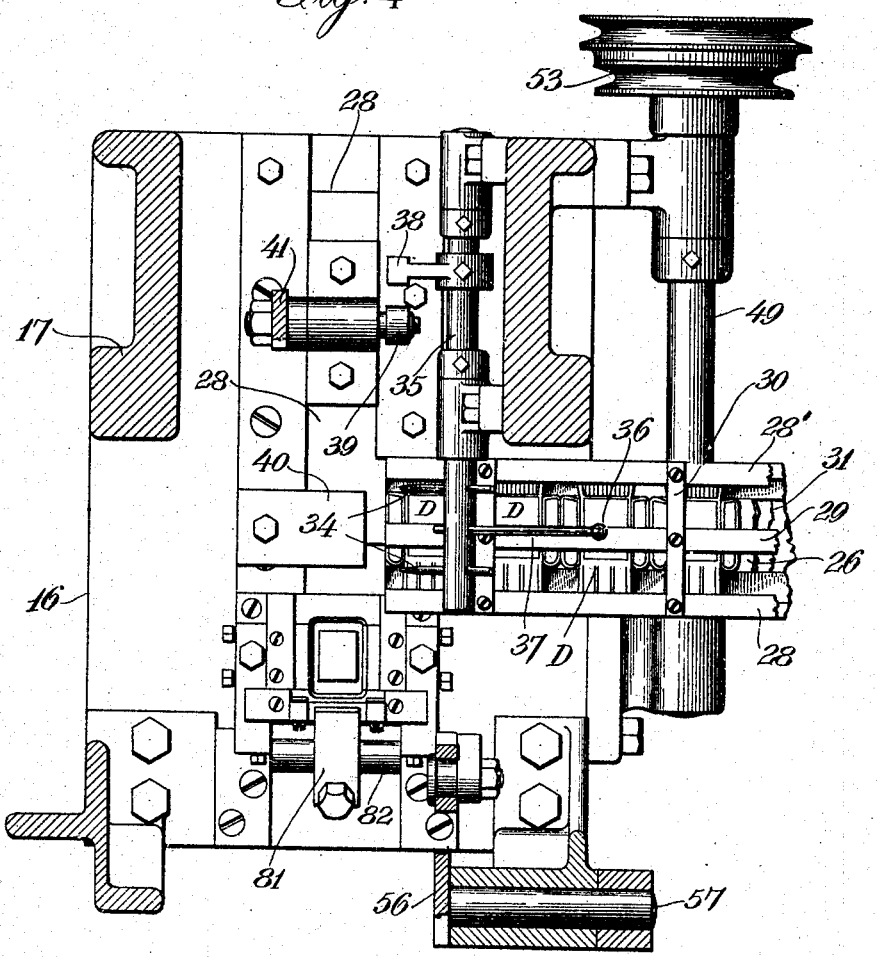
Figure 5:
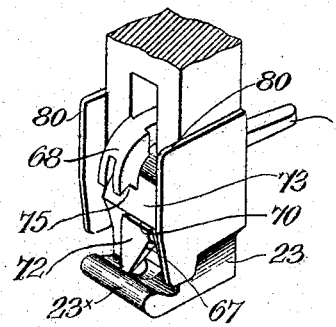

In the drawings—Figure 1 is a front elevation of a press embodying my invention in its preferred form. Fig. 2 is a side elevation thereof, partially in section. Fig. 3 is a transverse vertical section, as on the line 3—3 of Fig. 1. Fig. 4 is a transverse vertical section, as on the line 4—4 of Fig. 3. Fig. 5 is a perspective view, on an enlarged scale, of the punch-die and the jaws therein for supporting and carrying the box-lid. Figs. 6 to 11, inclusive, are sectional details of the co-acting dies, and adjuncts, as in actual operation, showing the parts in the respective positions which they are caused successively to assume during the application of a lid to the box-body. Fig. 12 is a perspective view of the box body, the lid being removed and shown in Fig. 13. Fig. 14 is a view of the completed box with its lid in open position.

A form of box such as the present apparatus has been designed to produce, is illustrated in Fig. 14 of the drawings, but it is to be understood, of course, that the mechanism herein shown and described may be modified by one skilled in the art so as to produce boxes of other structural characteristics.

As illustrated, the blank D for the body of the box comprises a single piece of sheet metal struck up to form a bottom $d$, side pieces $d'$, and end pieces $d^3$, one of the end pieces having therein, at or near its free edge, and parallel therewith, a groove or channel $d^4$; and the adjacent portions of the side pieces being formed with lips $d^5$. The side and end pieces of the blank thus formed are turned upward to constitute the sides and ends of the box, the grooved or channeled end being curved inward to form a spring member, and the lips of the side pieces being turned over upon the lateral edges of such curved spring member. The lid D' comprises also a single piece of sheet metal having its marginal edges slightly upset, the rear edge $d^6$ being notched at its ends to form teats or trunnions $d^7$. Such rear edge is seated in the grooved or channeled portion of the box body in such manner that the teats or trunnions are embraced by the proximate inturned lips of the side walls, thereby hingedly connecting the lid with the box body. The elastic pressure of the curved wall against the opposing edge of the lid thus serves to maintain the lid in either its opened or closed position.

15 indicates standards; 16 a bed thereon, and 17 a supporting frame rising from the bed.

18 is a die block on the bed furnished with an appropriate die 19 for the reception of a dished box blank.

The bottom of the die comprises a part 20 carried by the upper end of a rod 21 which is normally elevated by means of a suitably-disposed spring 22.

23 is a vertically movable punch which co-acts with the die 19. This punch is carried by a cross head 24 which is connected with the eccentric or crank portion of a driving shaft 25, by means of a rod 26, and thereby reciprocated.

The dished blanks are fed successively onto the raised bottom of the die 19 and into the path of the co-acting punch, so that the latter, in its descent, forces the underlying blank into the die and effects the up-turning of the sides and ends of the blank in the usual manner.

The blanks are produced on a suitable press and deposited successively upon a traveling belt 26 which conveys them along a runway 27 leading to the path of a horizontally reciprocating slide or pusher 28 by means of which the blanks are successively engaged and fed to the die, as below explained. To prevent upward displacement of the dished bodies during their travel along the runway, the side walls of the latter are provided with overhanging ledges 28' and a longitudinal median bar 29 supported by transverse bars 30, secured to the ledges. Upon the bottom of the runway is imposed a flexible metallic strip 31, upon which the upper stretch of the belt rests during its travel, and through such bottom, at intervals apart, extend set-screws 32 which engage the underside of the strip. By properly turning these screws, the strip may be nicely adjusted up or down to insure the uniform support, parallel with the ledges, of the upper traveling portion of the belt. Thus the otherwise liability of the sagging of the belt, and the consequent over or under sliding of the series of dished bodies thereon, are obviated.

Adjacent the junction of the runway and the path of the slide is an abutment which is periodically moved into and out of the path of the leading blank in the runway. In the present instance, the abutment comprises a pair of pins or fingers 34, depending from a horizontal rock shaft 35 which has its bearings in boxes on the main frame. The pins are held normally down in the path of the dished body blanks in the run-way by means of a spring 36 which is secured to the main-frame and to a laterally extending pin 37 on the rock shaft. On this rock shaft is an arm 38 which extends into the path of a laterally-projecting tappet roller 39 on the slide, whereby during the retraction of the latter the roller abuts against, passes under, and raises the arm 38, thus partially turning the rock-shaft and swinging its pins or fingers 34 forwardly and above the path of the proximate body blank. This blank, thus being unrestrained, is advanced by the action of the following blanks into the path of the slide; and under an overhanging guide piece 40; whereupon the roller 39 escapes the tappet, and the pins or fingers resume their normal position in front of the adjacent blank in the run-way.

In the initial forward movement of the slide, the rock-shaft with its fingers is oscillated by the actions of the tappet and spring devices, but as the slide has not at that time engaged the body blank in its path, the position of the blanks in the run-way is undisturbed. Continuing its forward stroke, the slide impinges against the body blank in its path, and thereby pushes the blank onto the die. During the return stroke of the slide, the stop pins 34 are raised as previously described to permit the delivery of another body blank to the path of the slide. In the present instance the slide is attached by a pin and slot connection, to the depending arm of a lever 41 whose upper arm carries a roller 42 which is held normally in contact with a cam 43 on the cross head by the action of a strong spring 44. One end of this spring is secured to the main frame, and the other end to an arm 45 extending from the pivot shaft of the lever. Thus, as the punch rises, the slide 28 is pushed by the action of the cam and lever devices toward the die so as to transfer the opposing blank to the die, and as the punch descends the slide is reciprocated by the retractive force of the spring.

The foot of the punch 23 is provided with a curved heel 23× upon which the channeled end portion $d^3$ of the box body is turned in a manner to receive and seat the notched end of a lid fed thereto.

The lids, similarly to the body-blanks, are produced on a suitable press and deposited successively upon a traveling belt 46 which conveys them along a runway 47. This runway leads to the mouth of a curved chute or guide-way 48 which extends forwardly and downwardly toward the foot of the elevated punch. (See Fig. 3).

In order to impel both carrier belts concertedly in opposite directions, so as to feed their respective lids and body blanks in proper order, the shafts 49, 50, of the pulleys 51, 52, respectively, for the belts, are extended rearwardly and provided with fixed pulleys or sheaves 53 which are connected by a crossed belt 54; one of the sheaves being a double wheel which is belted with and driven from a suitable source of power.

As the lids successively reach the guideway 48, each lid is pushed therein toward the punch by means of a suitable feed device. Such device, in the present instance, comprises a yielding pawl 55 carried by a swinging arm 56 borne by a rock shaft 57. One end of this shaft is provided with a crank arm 58 which is connected by means of a link 59 with a crank arm 60 carried by a rock shaft 61. On the latter shaft is a rearwardly-extending arm 62 to which is connected one end of a spring 63 whose lower end is attached to the main frame, the tendency of the spring being to draw down the arm 62, through the connections described, to swing the arm 56 toward the top of the chute or guideway 48. To the shaft 61 is also affixed an arm 63' carrying a roller 64 which bears against an eccentric 65 on the main shaft, whereby during the rotation of the latter the roller is moved in opposition to the action of the spring to throw the arm 56 toward the bottom of the guideway, and in rear of the opposing box lid. Hence, during the operation of the machine, the arm is oscillated and the pawl thereon is caused to swing from the top to the bottom of the guideway and back again. (See Figs. 1, 2 and 3).

The pawl 55 is pivoted to the arm 56, and is held yieldingly elevated by means of a spring 66 which is secured to a stud on the pivot and to the body of the arm, so that the pawl during the upward or return movement of the arm, will, upon contacting with the opposing lid in its path, swing yieldingly under the latter, and then upon escaping the lid, will resume its former position in rear thereof, preparatory to the succeeding down or feed movement of the arm.

It is to be noted that when the lid enters the top of the guideway, the lid is in a horizontal position, and that as it approaches the lower end of the guideway, the lid assumes a position slightly inclined to the vertical. At this stage, the lid is directed to the grasp of a pair of yielding jaws 67, 68, mounted within the punch. (See Figs. 3, and 5 to 12, inclusive.)

The jaw 67 comprises an arm pivoted at 69 and depending into a recess formed in the foot of the punch adjacent the heel thereof, such arm being provided with a suitably-disposed shoulder 70 which is adapted to receive and support the lower or notched edge of the lid which is directed thereto through the guideway. The jaw is held normally in position to receive the lid by the action of a spring 71 which is seated within the punch, and the outer face of the jaw immediately below the shoulder is slightly concaved as indicated at 72. A plate 73, which may be termed a stripper, is affixed to the punch to span the space immediately above the shoulder when the jaw is in normal position.

The upper jaw 68 comprises the bifurcated curved arm of a lever which is fulcrumed at 74, the acting portion of the jaw being notched at 75 to receive the upper edge of the lid. The other arm 76 of the lever extends rearwardly and is held normally raised by means of a spring 77 secured thereto, and to the punch. A suitably-disposed set-screw 78 on the main frame serves as an adjustable stop for the lever arm 76 so as to maintain the jaw in open position when the punch is raised.

The lower end of the punch is provided with projecting side plates 80 which guide the lid to the jaws and prevent its lateral displacement.

When the lid has been guided to and seated on the shouldered jaw 67, as indicated in Fig. 6, the punch descends therewith, and as the lever-arm 76 for the upper jaw leaves the abutment 78, such upper jaw is caused by the action of the spring 77 to grasp the upper edge of the lid, as seen in Fig. 7. The punch in its descent strikes the underlying dished body-blank and forces it partially down into the die, as represented in Fig. 8. The curved end of the box at this stage, extends above the heel of the punch and in the path of a vibrating presser device. This device preferably comprises a toe 81, carried by a rock shaft 82 which bears a crank arm 83 that is pivotally connected with a lever arm 84 depending from a rock shaft 85. On this shaft is an upwardly extending arm 86 provided at its upper end with a roller 87 which is held normally in contact with a cam 88 on the main shaft by the action of a spring 89 which is secured to said arm and to a projecting piece on the main frame. By this construction the toe 81 is vibrated during the operation of the machine, the inward throw being imparted to the toe by the positive action of the cam and the outward throw by the stress of the spring. In its inward stroke, the toe bears against the opposing upwardly projecting end portion of the box and forces such portion over and upon the heel of the punch. During such operation the forward edge of this portion bears forcibly against the opposing concave face of the jaw 67 and swings the latter rearward against the action of the spring 71 so as to retract the sustaining shoulder 70 from the lower edge of the lid, whereupon the upper jaw 68 suddenly forces the unsupported lid down upon the channeled portion of the turned-over end of the box body. (See Fig. 9). As the plunger continues and completes its descent (as seen in Fig. 10), the sides and the front end wall of the box-body are fully pressed into position by the co-acting dies, the side lips $d^5$ thus overlapping the teats or trunnions of the lid. The box is now finished. In the succeeding ascent of the punch, the box with its lid in open position, is raised therewith, as shown in Fig. 11. In order to strip the box from the punch, a bracket 90 is fixed to the main frame in the path of the forward end of the box, which end, taking against the bracket, is forced downward thereby below the foot of the punch, and the jaw 67 by the recoil of its spring 71, throws the box forcibly forward from the punch. The box falls into a chute (not shown), and is directed thereby to a suitable point of discharge.

I claim—

1. In a machine of the character described, the combination with a die and its complementary punch whereby a box body is formed from a suitable blank, of a pair of lid clamping and releasing jaws carried by said punch, means for feeding a box-body portion to the die, means for feeding a lid to the grasp of said jaws, whereby the lid is held at its upper and lower edges and carried into the die for engagement with the box body therein, and means whereby said lid is released from the jaws during the active stroke of the punch upon the body portion within the die.

2. In a machine of the character described, the combination with a die and its complementary punch whereby a box body is formed from a suitable blank, of lid clamping and releasing jaws carried by said punch, means for feeding a box-body portion to the die, means for feeding a lid to the grasp of said jaws, whereby such lid is held at opposite edges and carried into the die for engagement with the box-body therein, and means whereby the lid is released from the jaws when the punch enters the die.

3. In a machine of the character described, the combination with a die and its complementary punch, whereby a box body is formed from a suitable blank, of lid clamping and releasing jaws carried by said punch, means for feeding a box-body portion to the die, means for feeding a lid to the grasp of said jaws whereby such lid is held at its upper and lower edges and carried into the die for engagement with the box-body therein, and means whereby the lower jaw is moved to unseat the lid therefrom when the punch enters the die.

4. In a machine of the character described, the combination with a die and its complementary punch whereby a box body is formed from a suitable blank, of a pair of lid-clamping and releasing jaws carried by said punch, means for feeding the box-body portion to the die, means for feeding a lid to the grasp of said jaws whereby the lid is carried into the die for engagement with the box body therein, and a presser device adapted to bear against the opposing end of the body portion within the die and force the same over against the lower jaw to release the lid therefrom.

5. In a machine of the character described, the combination with a die and its complementary punch whereby a body is formed from a suitable blank, of upper and lower clamping and releasing jaws carried by said punch, means tending to maintain said jaws normally in clamping position, means to effect independent upward movement of the upper jaw when the punch is elevated from the die, to permit the seating of a lid on the lower jaw, whereby in the initial descent of the punch toward the die, the said upper jaw moves down upon and engages the opposing edge of the lid and carries it into the die for engagement with the box body therein, and means whereby the lower jaw is moved to unseat the lid therefrom when the punch enters the die.

6. In a machine of the character described, the combination with a die and its complementary punch, of upper and lower clamping and releasing jaws on said punch, means tending to maintain said jaws normally in clamping position, means to effect independent upward movement of the upper jaw when the punch is elevated, to permit the seating of a lid on the lower jaw, whereby, in the initial descent of the punch, the upper jaw moves down upon and engages the opposing edge of the lid, a presser device adjacent the die, and means for moving said device toward and from the path of the lower jaw when the punch is in engagement with the die.

7. In a machine of the character described, the combination with a die, of a complementary punch therefor having a recessed lower portion, upper and lower jaws pivoted on said punch, the lower jaw depending into such recessed portion, means to maintain said jaws normally in clamping position, means to effect independent upward movement of the upper jaw when the punch is elevated, to permit the seating of a lid on the lower jaw, whereby in the initial descent of the punch the upper jaw moves down upon and engages the opposing edge of the lid, a presser device adjacent the die, and means for moving said device toward and from the depending portion of the lower jaw when the punch is in engagement with the die.

8. In a machine of the character described, the combination with a die and its complementary punch, of upper and lower clamping and releasing jaws on said punch, means tending to maintain said jaws normally in clamping position, means to effect relative opening of said jaws when the punch is elevated to permit the seating of the lid on the lower jaw, whereby, in the initial descent of the punch the lid is grasped by the jaws, a relatively fixed stripper in front of the lower jaw, and means for moving the said lower jaw rearwardly of the stripper when the punch is in engagement with the die.

9. In a machine of the character described, the combination with a die, of a complementary punch therefor, upper and lower jaws pivoted on said punch, the upper jaw having a rearward extension, springs to maintain said jaws normally in clamping position, a stop in the path of the rearward extension of the upper jaw, a presser device adjacent the die, and means for moving said device toward and from the path of the lower jaw when the punch is in engagement with the die.

10. In a machine of the character described, the combination with a die, of a complementary punch therefor, upper and lower jaws pivoted on said punch, the upper jaw having a rearward extension, springs to maintain said jaws normally in clamping position, a stop in the path of the rearward extension of the upper jaw, a stripper in front of the lower jaw, a presser device adjacent the die, and means for moving said device toward and from the path of the lower jaw when the punch is in engagement with the die.

11. In a machine of the character described, the combination with a die, of a complementary punch therefor, lid-holding and releasing devices on the punch, a chute or guide leading to said devices, a yielding feed-pawl movable within and along said chute, a rock arm carrying said pawl, a rock shaft, connections between the same and said arm, a spring tending to maintain the said rock shaft in one position, an eccentric, connections between the same and said shaft, and means for supporting and actuating said eccentric.

12. In a machine of the character described, the combination with a co-acting die and punch, of a pusher whereby blanks are successively fed to the die, means for reciprocating said pusher, a way through which said blanks are fed to the path of the pusher, a stop at the delivery end of said way, and means under the control of the pusher whereby said stop is moved into and out of action during the reciprocation of the pusher in order to permit the successive delivery of the blanks to the latter.

13. In a machine of the character described, the combination with a co-acting die and punch, of a pusher whereby blanks are successively fed to the die, means for reciprocating said pusher, a way through which said blanks are fed to the path of the pusher, a stop at the delivery end of said way, a rock-shaft carrying said stop, means to maintain said shaft normally in a position with the stop in action, a tappet on the pusher, and a projection on the shaft extending into the path of said tappet.

14. In a machine of the character described, blank feeding mechanism comprising a run way, an adjustable bottom member therein, a traveling belt extending through said run way and resting upon said bottom member, and devices at intervals along the run way for vertically-adjusting said bottom member.

Signed at Barberton in the county of Summit and State of Ohio this 2nd day of April, 1906.

JOHN W. DENMEAD.

Witnesses:
B. C. Ross,
F. M. Root.